United States Patent

Aoki et al.

(10) Patent No.: US 6,604,773 B2
(45) Date of Patent: Aug. 12, 2003

(54) SUN-VISOR OF A VEHICLE EQUIPPING AN OCCUPANT RESTRAINT SYSTEM

(75) Inventors: Takashi Aoki, Saitama (JP); Hidetoshi Utsumi, Saitama (JP); Fumiharu Ochiai, Saitama (JP); Naohiko Saita, Saitama (JP); Yuichi Saito, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/157,765

(22) Filed: May 29, 2002

(65) Prior Publication Data

US 2002/0180234 A1 Dec. 5, 2002

(30) Foreign Application Priority Data

Jun. 1, 2001 (JP) ........................ 2001-166380

(51) Int. Cl.$^7$ .................................................. B60J 3/00
(52) U.S. Cl. ...................................................... 296/97.9
(58) Field of Search ................................ 296/97.9, 189; 280/730.2

(56) References Cited

U.S. PATENT DOCUMENTS

| | | | | |
|---|---|---|---|---|
| 5,580,117 A | * | 12/1996 | Goclowski | |
| 5,855,443 A | * | 1/1999 | Faller et al. | |
| 6,173,990 B1 | * | 1/2001 | Nakajima et al. | |
| 6,334,626 B2 | * | 1/2002 | Nakajima et al. | |
| 2002/0013186 A1 | * | 1/2002 | Webb | |

* cited by examiner

Primary Examiner—D. Glenn Dayoan
Assistant Examiner—Scott Carpenter
(74) Attorney, Agent, or Firm—Carrier Blackman & Associates, P.C.; Joseph P. Carrier; William D. Blackman (57) ABSTRACT

A sun-visor provided in a vehicle includes a sun-visor body, a shaft, and low strength region. The sun-visor body is used for blocking off the outside light. One end of the shaft is inserted into the sun-visor body and another end of the shaft is rotatably supported at the roof of the vehicle through a base. The low strength region of the shaft permits the sun-visor to be readily deformed by a side air bag deployed into the vehicle cabin, thereby achieving a certain inflation of the air bag irrespective of the position of the sun-visor.

11 Claims, 6 Drawing Sheets

SUN-VISOR OF A VEHICLE EQUIPPING AN OCCUPANT RESTRAINT SYSTEM

BACKGROUND OF THE INVENTION

1. FIELD OF THE INVENTION

The present invention relates to a sun-visor provided in a vehicle having an occupant restraint system.

2. DESCRIPTION OF RELEVANT ART

In a vehicle, conventionally, a sun-visor, which is used as sunshade by passengers seating on the driver seat or the passenger seat, is provided. This sun-visor is composed of a shaft and a sun-visor body. The sun-visor body is used for blocking off the outside light. One end of the shaft is supported at the roof of the vehicle and another end thereof is inserted into the sun-visor body.

The sun-visor is normally dabbed or rested against the roof, and is swung downwardly and/or laterally around the shaft at the time of using. When the sun-visor is swung toward the windshield, since the outside light is prevented from passing into the vehicle by the sun-visor body, the sun-visor plays a roll of sunshade.

When the sun-visor body is pivoted toward the side door from this location, the sun-visor serves as the sunshade for preventing the passing through of the outside light shining from the side direction. At that time, the sun-visor is placed along the window of the side door so as to be in parallel with respect to the window of the side door.

In the vehicle, furthermore, an occupant restraint system for protecting the passengers from a side-face impact etc. may be provided.

As an example of such types of the occupant restraint system, an inflatable curtain apparatus can be given. In the inflatable curtain apparatus, an air bag is stored ranging over the regions from the front pillar to a rear pillar through a roof side rail of the vehicle. This air bag is quickly inflated when the operation of the inflatable curtain apparatus is demanded.

When the air bag stored it the roof side rail is inflated, for example, since the inflated air bag pushes open the roof-garnish into the vehicle cabin, a space is formed between the roof-garnish and the roof side rail. Thus, the air bag is sprung out through the space and is inflated downwardly along the windows of the side door(s).

When the inflatable curtain apparatus is operated while using the sun-visor for blocking off the outside light shining from the side direction, in other words, the sun-visor is positioned along the window of the side-door, the inflating characteristic of the air bag may be changed. To be more precise, the inflating direction and range of the air bag is changed by the sun-visor, and the role of the air bag cannot be fully achieved.

When the roof-garnish pushed open by the inflation of the air bag is bumped against the sun-visor body of the sun-visor, since the displacement of the roof-garnish is interfered with by the sun-visor, the space formed for allowing the inflation of the air bag becomes narrow. Thus, the inflation of the air bag toward the vehicle cabin may be hampered or prevented. When the sun-visor body of the sun-visor is positioned on the inflating orbit of the air bag, furthermore, the inflation of the air bag may be hampered or prevented by the sun-visor.

SUMMARY OF THE INVENTION

The present invention aims at ensuring the inflation of the air bag irrespective of the position of the sun-visor.

For attaining this object, there is provided a sun-visor in a vehicle having an occupant restraint system for protecting the occupant from side-impact, said sun-visor comprising; a sun-visor body disposed in a cabin of said vehicle and used for blocking off the outside light; a shaft, one end of said shaft is rotatably supported at a base fixed to the roof of said vehicle, another end of said shaft is inserted into said sun-visor body, and said shaft has a curved part on a region exposed from said sun-visor body and said base; and the shaft also has a low strength region provided on or about said curved part; whereby said shaft is situated so as to be deformed when said occupant restraint system is operated.

According to the sun-visor having such defined structure, the shaft is deformed at the low strength region when the occupant restraint system is operated. To be more precise, the space for allowing the inflation of the air bag stored in the occupant restraint system is secured because the sun-visor is easily deformed by the roof-garnish 14 pushed out by the inflated air bag. Thus, the certain inflation of the air bag is achieved irrespective of the position of the sun-visor.

In the present invention, preferably, said low strength region comprises a notch formed on said curved part of said shaft. According to the present invention, the certain deformation of the shaft can be achieved because the excess load, which is brought about by the operation of the occupant restraint system and is applied to the sun-visor, is concentrated on the notch of the curved part 17c.

DETAILED DESCRIPTION OF THE PREFERRED EMBODIMENTS

First Preferred Embodiment

Figure 1:
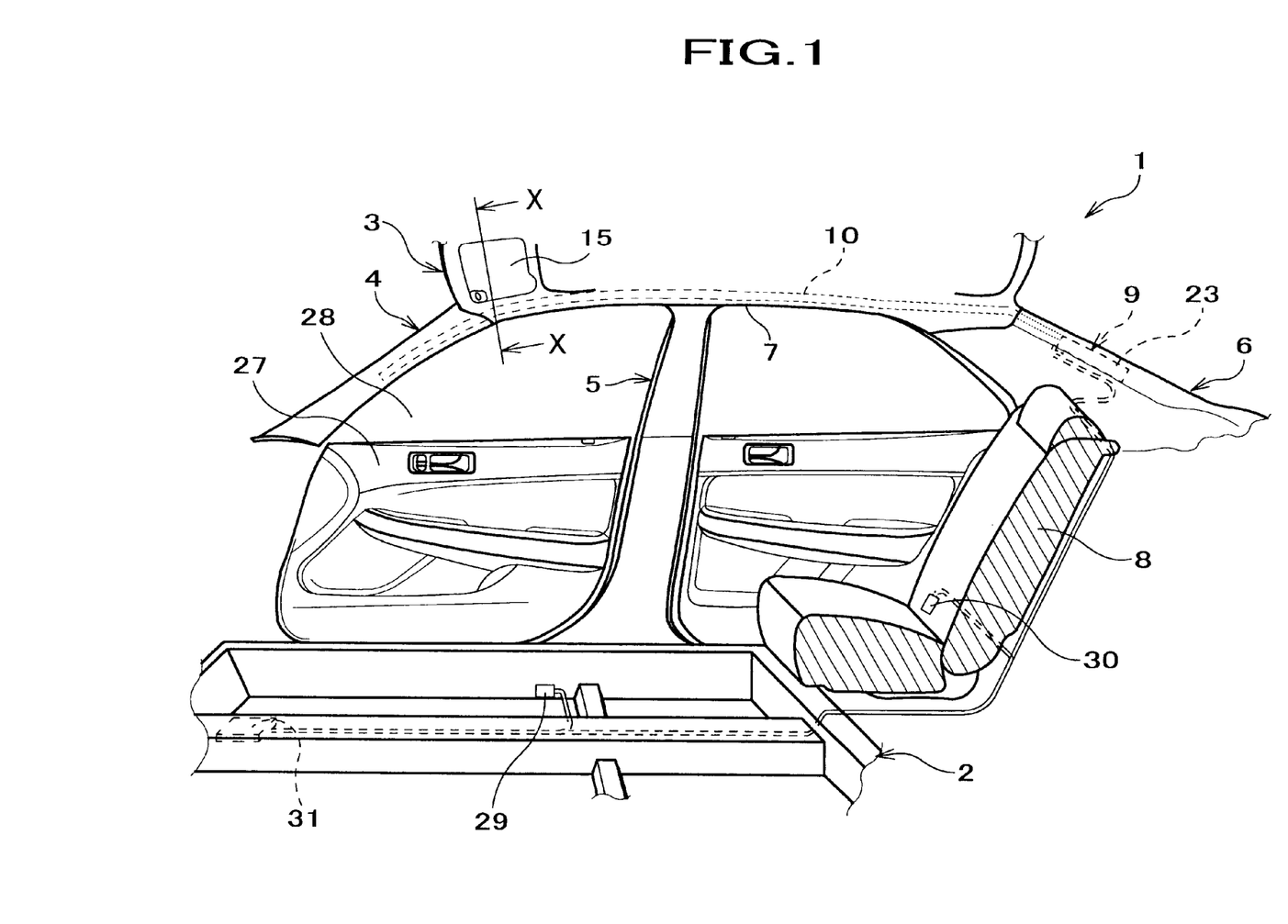
FIG. 1 is an explanation view showing the construction of the car cabin in which the sun-visor according to an embodiment of the present invention is disposed.
Figure 2:
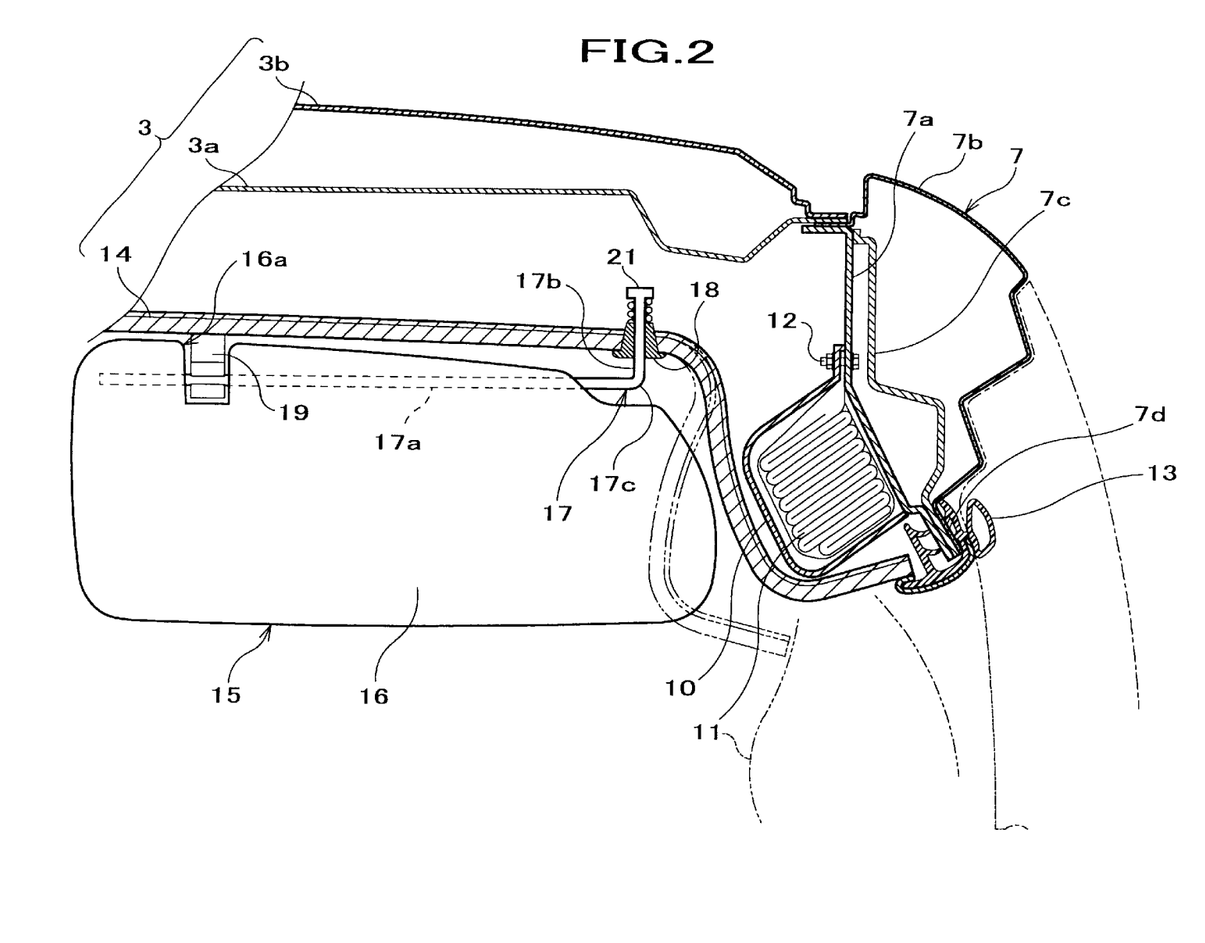
FIG. 2 is a sectional view along the line X—X in FIG. 1.
Figure 3:
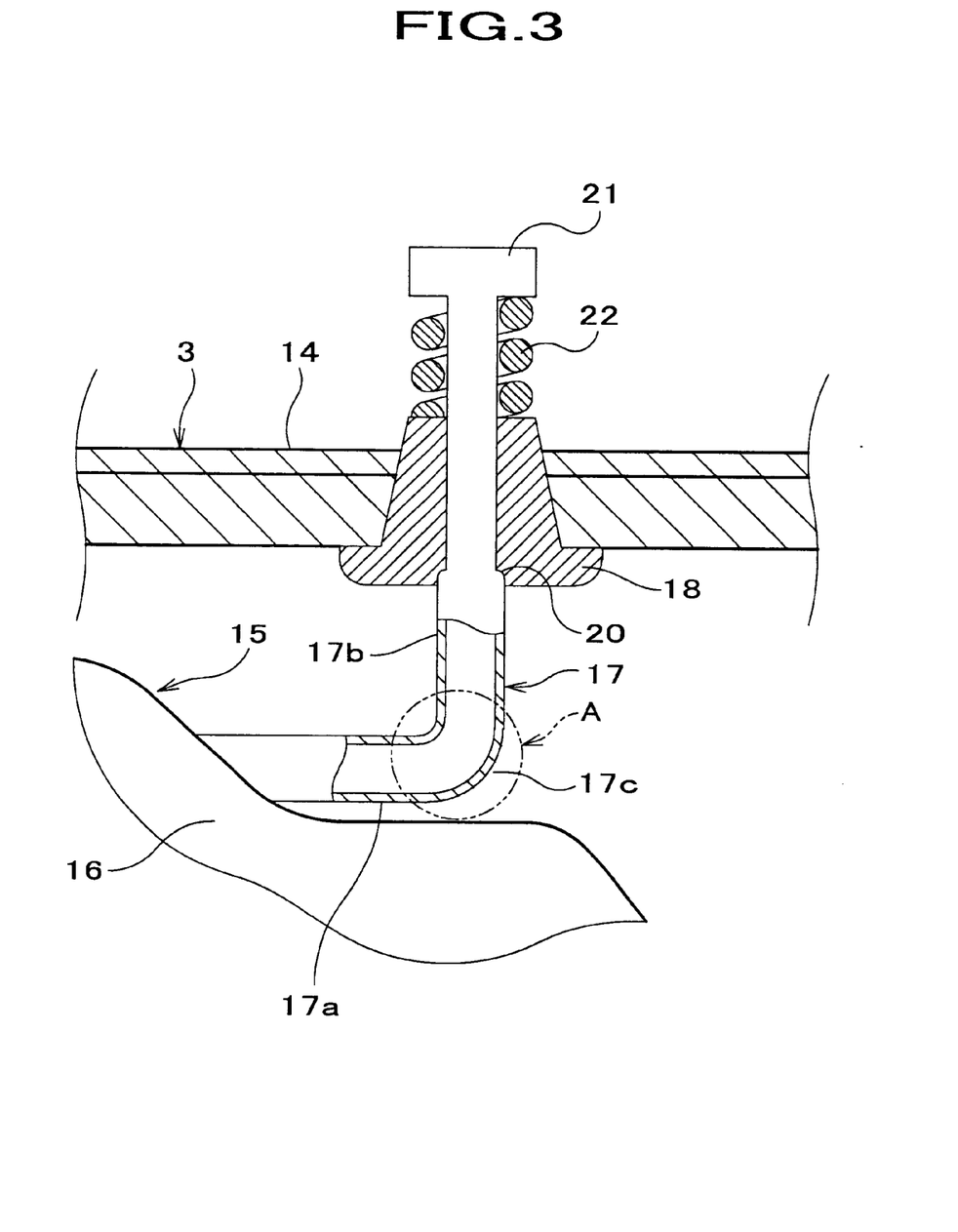
FIG. 3 is an enlarged view showing the construction of a part of the sun-visor according to the present embodiment.
Figure 4:
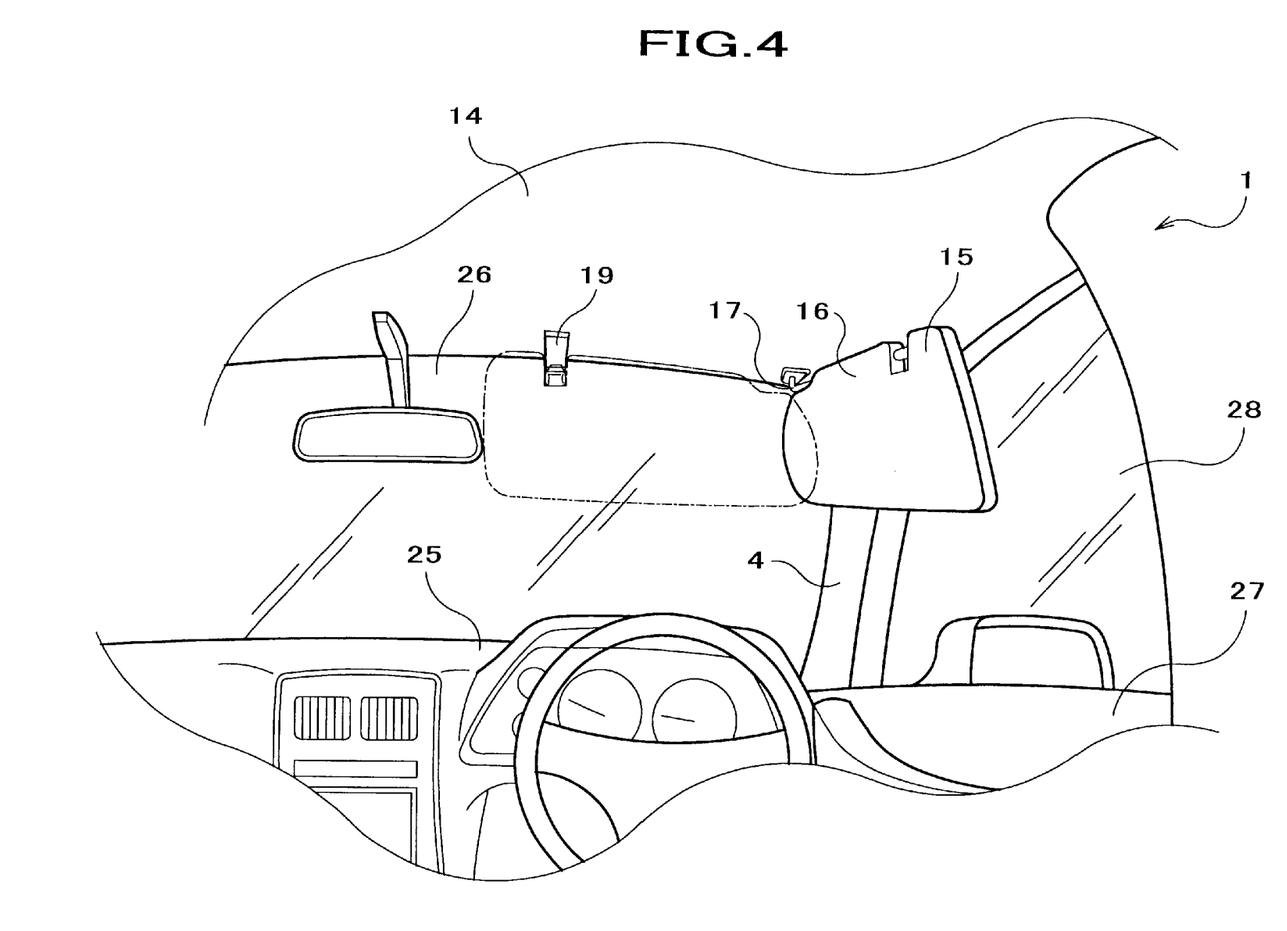
FIG. 4 is an explanation view showing the condition that the sun-visor is used for blocking off the outside light shining from the side direction.
Figure 5:
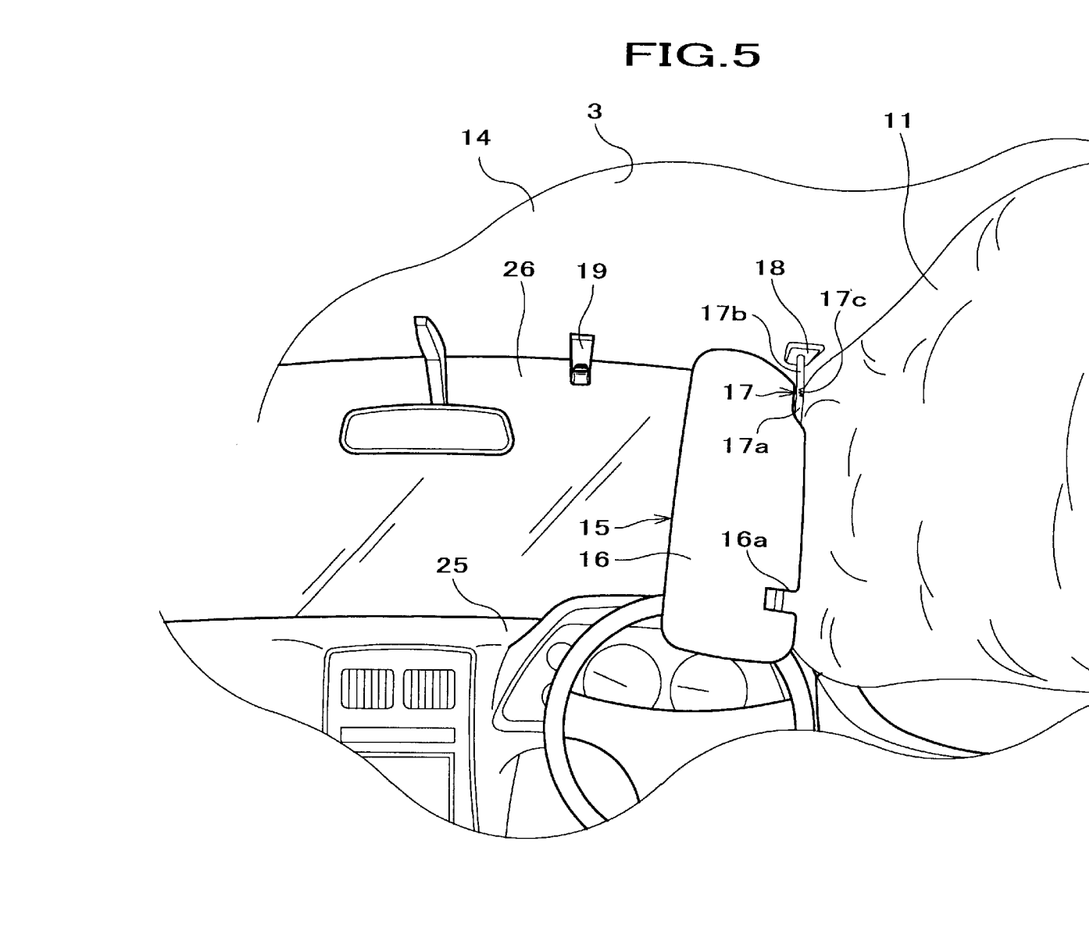
FIG. 5 is a explanation view similar to FIG. 4, but showing the condition where the occupant restraint system has been deployed and deformed the sun visor shaft.

The explanation about the first preferred embodiment of the present invention will be carried out referring to FIGS. 1–5 of the attached drawings. FIG. 1 is an explanation view showing the vehicle cabin having the occupant restraint system. FIG. 2 is a sectional view along the line X—X of FIG. 1 showing the condition of having rotated the sun-visor toward the windshield. FIG. 3 is an enlarged view of part of FIG. 2. FIG. 4 is an explanation view showing the sun-visor under-a use condition adjacent a side window. FIG. 5 is an explanation view showing the inflated condition of the air bag, where the sun visor has been deformed by the air bag.

As shown in FIG. 1, a car body construction of a vehicle 1 is composed of a floor 2, a roof 3, a front pillar 4, a center pillar 5, a rear pillar 6, and a roof side rail 7. A seat 8 and a sun-visor 15 etc. are accommodated in this car body construction.

In the present embodiment, the sun-visor 15 is capable of blocking off the outside light (sunlight etc.) shining from the front or side direction with respect to the vehicle 1.

In the vehicle 1 having these constructions, an inflatable curtain apparatus 9 shown in the broken line of FIG. 1 is equipped. The inflatable curtain apparatus 9 has a cover 10 disposed ranging over the region from the front pillar 4 to the rear pillar 6 through the roof side rail 7. As shown in FIG. 2, an air bag 11 is stored in the cover 10 in a folded condition. An inflator 23 for supplying the gasses to the air bag 11 is accommodated within the rear pillar 6.

The arrangement of the air bag 11 and the cover 10 will be carried out referring to FIG. 2.

The roof side rail 7, to which the air bag 11 and the cover 10 are fixed, is composed of an inner member 7a, an outer member 7b, and a center member 7c. The inner member 7a is an inner blanket. The outer member 7b is the blanket placed in the most outer side. The center member 7c is the blanket placed between the inner member 7a and the outer member 7b.

A top end part of the roof side rail 7 is joined to the roof 3. A bottom end part of the roof side rail 7 is engaged into a weather-strip 13. The weather-strip 13, to which the inner member 7a, the outer member 7b, and the center member 7c, are engaged, respectively, is joined to the side-door. In the roof side rail 7 of this construction, the air bag 11 and the cover 10 are attached to the inner member 7a by the bolt 12 etc., respectively.

The explanation about the construction and the function of the sun-visor 15 according to the present embodiment will be carried out referring to FIG. 2 through FIG. 5.

First, the explanation about the construction of the roof 3, by which the sun-visor 15 is supported, will be carried out. The roof 3 is composed of an inner member 3a, an outer member 3b, and a roof-garnish 14. The inner member 3a, which is an inner blanket, and the outer member 3b, which is the blanket placed in the most outer side, are joined to the roof side rail 7, respectively.

A tip part of the roof-garnish 14 is attached to the weather-strip 13. The roof-garnish 14 is constructed so as to be deformed in the state shown in the imaginary line (two-dot chain line)in FIG. 2, when the air bag 11 is inflated and the force( load) toward the car cabin is added to the roof-garnish 14.

The sun-visor 15 supported at the roof 3 is composed of a sun-visor body 16, a shaft 17,and a base 18. The sun-visor body 16 is used for blocking off the outside light shining from outside. The shaft 17 is inserted into the sun-visor body 16 and has L-shaped figure. The base 18 is used for rotatably supporting the shaft 17 at the roof 3.

A notch 16a is formed on the sun-visor body 16, and part of the shaft 17 inserted into the sun-visor body 16 is exposed thereat.

The exposed part of the shaft 17, in other words, the part just in position at the notch 16a, is engaged with a mounter 19 fixed at the roof-garnish 14. As a result of the existence of the mounter 19, the position of the sun-visor 15 can be stably maintained and the swinging movement of the sun-visor body 16 is achieved with ease.

The shaft 17 is bent into the L-shape. In this shaft 17, one side having a longer entire length from the curved part 17c is defined as a long shaft arm 17a. Another side having the shorter entire length from the curved part 17c is defined as a short shaft arm 17b. In the sun-visor 15 of the present embodiment, part of the long shaft arm 17a is inserted into the sun-visor body 16.

As shown in FIG. 2 and FIG. 3, the short shaft arm 17b has a step part 20 at the middle thereof, and has a stopper 21 at the tip end thereof. The tip side of the short shaft arm 17b is inserted into the base 18 for attaching the sun-visor 15 to the roof 3. In this condition, the step part 20 of the short shaft arm 17b is directly contacted with the base 18. In the present embodiment, the step part 20 and the stopper 21 are provided for limiting or preventing up-and-down direction movement (saccadic movement) of the sun-visor 15.

In this construction, since the stopper 21 is impelled upwardly by the spring 22, only slight up-and-down direction movement of the shaft 17 is allowed. In other words, the excess saccadic movement of the sun-visor 15 is prevented.

Heat-treatment is given to the region A near the curved part 71c of the shaft 17 as shown in FIG. 3. Thus, the strength at the region A becomes weaker than other regions of the shaft 17.

This region A of low strength is provided so that the shaft 17 may be deformed in the region A when the inflatable curtain apparatus 9 is operated. To be more precise, the shaft 17 is deformed in the region A by the force (load) brought out from the inflation of the air bag 11 when the air bag is inflated as a result of the operation of the inflatable curtain apparatus 9.

In the present embodiment, the region A contains not only the whole curved part 17 but also parts of the long shaft arm 17a and the short shaft arm 17b, respectively, adjacent the curved part 17. The region of the long shaft arm 17a inserted into the sun-visor body 16 and the region of the short shaft arm 17b inserted into the base 18 are not contained in the region A. In other words, heat-treatment is not given to the region of the long shaft arm 17a inserted into the sun-visor body 16 and the region of the short shaft arm 17b inserted into the base 18.

The sun-visor 15 is dabbed or rested against the roof 3 when not in use. When using the sun-visor 15 for blocking off the outside light shining from the front direction with respect to the vehicle 1, the sun-visor body 16 of the sun-visor 15 is swung downwardly at an appropriate angle around the long shaft arm 17a. Thereby, the sun-visor body 16 of the sun-visor 15 is placed in the position shown by the imaginary line in FIG. 4. As this, since part of the windshield 26 located between the roof 3 and the instrument panel 25 is covered by the sun-visor body 16, part of the outside light shining from the front direction is blocked off.

When using this sun-visor 15 for blocking off the outside light shining from side direction with respect to the vehicle 1, the sun-visor 15 is moved from the position shown in the imaginary line shown in FIG. 4 to the position shown in the full line of the FIG. 4. This movement is achieved by pivoting the sun-visor body 16 of the sun-visor 15 around the short shaft arm 17b at an appropriate angle.

Thereby, since part of the side-window 28 of the side door 27 is covered by the sun-visor body 16, part of the outside light shining from the side direction with respect to the vehicle body 1 is blocked off.

As follows is an explanation about the inflation of the air bag 11 in the case where the air bag 11 is inflated as a result of the side-face impact etc., while the sun-visor body 16 of the sun-visor 15 is disposed in the position shown in the full line of FIG. 4.

As shown in FIG. 4, when the vehicle 1 has had an accident such as a side-face impact while the sun-visor body 16 of the sun-visor 15 is disposed along the side door 27, and an impact more than a predetermined value is detected by the acceleration sensors 29 and 30, an electronic control unit (ECU) 31 sends the startup signal to the inflator 23.

Since the inflator 23 supplies the gasses to the air bag 11 in response to the startup signal and thus the air bag 11 is inflated, the vulnerable part (not shown) of the cover 10 is ruptured by the inflating air bag 11. Then the air bag 11 as burst out from the cover 10 is inflated toward the roof-garnish 14.

When the air bag 11 is inflated, furthermore, the air bag 11 is damped against the roof-garnish 14, and the roof-garnish 14 is pushed to the position shown in the imaginary line of FIG. 2.

Then, the air bag 11 is inflated into the car cabin in the state shown in FIG. 5 through both the space formed between the roof-garnish 14 and the roof side rail 7 and the space formed between the roof-garnish 14 and the weather-strip 13. And finally, as shown in FIG. 5, the air bag 11 is inflated along the side-window 28 of the side door 27, and protects the occupant of the vehicle from the impact given from the side direction with respect to the vehicle 1.

During the course of the inflation of the air bag 11, since the roof-garnish 14 displaced by the inflated air bag 11 and the inflated air bag 11 are bumped against the sun-visor body 16 of the sun-visor 15, a force pushing the sun-visor body 16 aside is given to the sun-visor 15.

At this occasion, since the region A having a lower strength than the other parts of the shaft 17 is provided at the vicinity of the curved part 17c of the shaft 17, the shaft is deformed in the curved part 17c or the vicinity thereof, causing the sun-visor body 16 to move downwardly.

Thereby, since the space for allowing the displacement of the roof-garnish 14 and the inflation of the air bag 11 without restriction is secured, the inflation of the air bag is reliably achieved within the predetermined inflation time irrespective of the location of the sun-visor 15.

Second Preferred Embodiment

Figure 6:
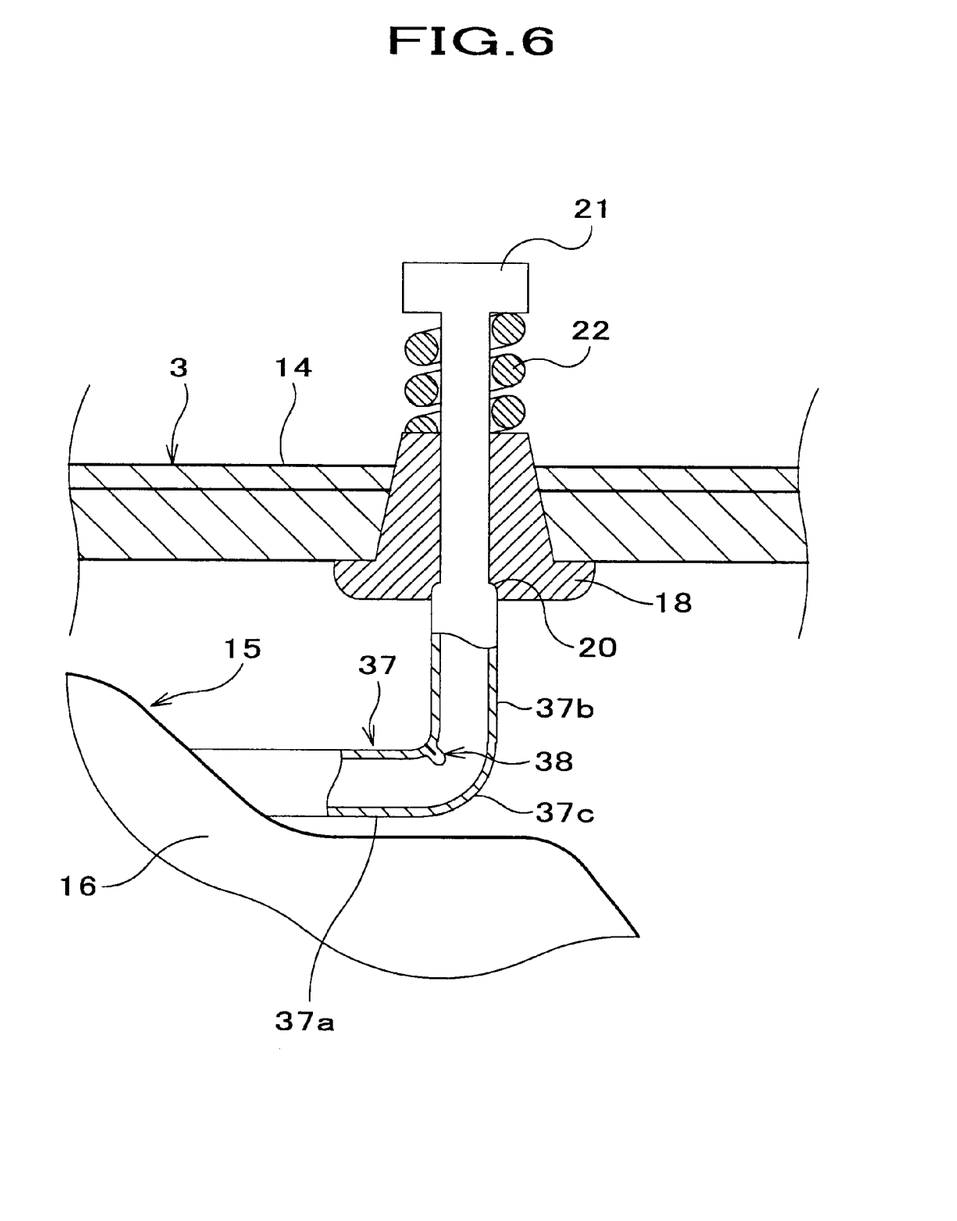
FIG. 6 is an enlarged view similar to FIG. 3, but showing another embodiment of the sun-visor according to the present invention.

The explanation about the second preferred embodiment of the present invention will be carried out referring to FIG. 6.

In the following explanation, the components which are the same as explained in the first preferred embodiment are indicated by the same symbol, and the brief explanation thereof is omitted.

The sun-visor 15 according to the present preferred embodiment has a sun-visor body 16, a shaft 37 inserted into the sun-visor body 16, and a base 18 for rotatably supporting the shaft 37 at the roof 3. A notched part 38 is formed at the curved part 37c located between the long shaft arm 37a and the short shaft arm 37b.

The notched part 38 is a helical groove formed at the position having a large curvature of the curved part 37c. Due to the existence of the notched part 38, the strength of the curved part 37c becomes weaker than other parts of the shaft 37. Thereby, the region of small strength according to the present embodiment is served in the curved part 37c of the shaft 37.

When the impact caused by the side-face impact etc., is applied to the vehicle 1 while using the sun-visor 15 for blocking off the outside light shining from the side direction, the inflatable curtain apparatus 9 is actuated into operation. As a result of the operation of the inflatable curtain apparatus 9, since the roof-garnish 14 displaced by the inflation of the air bag and/or the air bag is/are bumped against the sun-visor body 16 of the sun-visor 15, a force pushing the sun-visor body 16 aside is applied to the sun-visor 15.

In that occasion, since the strength of the curved part 37c having the notched part 38 is lower than other parts of the shaft 37, the shaft 37 is deformed at the curved part 37c and the sun-visor 15 is moved downwardly.

As a result of this movement, since the space for allowing the deformation of the roof-garnish 14 and for allowing the inflation of the air bag 11 are secured, the inflation of the air bag 11 within the predetermined time can be achieved.

The present invention is not restricted to above-described embodiments, and can be represented with various forms.

The low strength region of the shaft 17 may be formed anywhere in the part of or all of the region from the exposed part of the long shaft arm 17a at the notched part of the sun visor body 16a to the step part 20 of the short shaft arm 17b through the curved part 17c. In other words the low strength region need not be formed at the curved part 17c of the shaft 17.

When the low strength region is provided at any of such positions, since there is no necessity to deform the sun-visor body 16 and the base 18, the deformation of the sun-visor 15 with relatively small force can be achieved.

Therefore, the space for allowing the inflation of the air bag 11 can be secured easily. In the sun-visor 15 of this construction, since the stress tends to be concentrated on the curved part 17c, if the low strength region is formed at the curved part of the shaft, the shaft is easily deformed. Consequently, in the first and second embodiments, the low strength region is formed at the curved part or near the curved part.

The formation of the low strength region is not restricted to heat-treating or the provision of the notched part 38. For example, the provision of a through hole in the shaft can be adopted as the manner of forming the low strength region. Furthermore, the formation of a thin thickness part in the shaft as the low strength region can also be adopted. As will be understood, any type of formation manner can be adopted as long as the regions of different strength for allowing the shaft deformation with relatively small force are formed on the shaft.

In the present invention, the low strength region having a lower strength than other parts of the shaft is provide on the shaft of the sun-visor of the vehicle having the occupant restraint system. Therefore, since the shaft is deformed in the low strength region when the air bag is inflated and force is applied to the shaft, the space for allowing the inflation of the air bag and the deformation of the roof-garnish can be reliably secured.

Thus, since the certain inflation of the air bag irrespective of the location of the sun-visor 15 can be achieved, the certain protection of the occupant of the vehicle against the impact given from the side direction with respect to the vehicle can be accomplished.

In the present invention, furthermore, since the notched part formed at the curved part of the shaft may serve as the low strength part, the shaft of the sun-visor can be easily deformed using the stress which is concentrated on the curved part.

Although there have been described what are the present embodiments of the invention, it will be understood by persons skilled in the art that variations and modifications may be made thereto without departing from the gist, spirit or essence of the invention. The scope of the invention is indicated by the appended claims.

What is claimed is:

1. A sun-visor provided in a vehicle having an occupant restraint system for protecting an occupant from side-impact, said sun-visor comprising;

a sun-visor body disposed in a cabin of said vehicle for blocking off outside light;

a shaft, one end of said shaft being rotatably supported at a base fixed to a roof of said vehicle, another end of said shaft being inserted into said sun-visor body, and said shaft having a curved part on a region exposed from said sun-visor body and said base; and said shaft also having a low strength region provided on or about said curved part;

whereby said shaft is situated so as to be deformed when said occupant restraint system is operated.

2. A sun-visor provided in a vehicle having an occupant restraint system for protecting the occupant from the side-impact according to claim 1, wherein said low strength region comprises a notch formed on said curved part of said shaft.

3. A sun-visor provided in a vehicle having an occupant restraint system for protecting the occupant from the side-impact according to claim 1, wherein said low strength region is formed by heat treating on said curved part.

4. A sun-visor provided in a vehicle having an occupant restraint system for protecting an occupant from side-impact, said sun-visor comprising;

a sun-visor body disposed in a cabin of said vehicle for blocking off outside light;

a shaft, one end of said shaft being rotatably supported at a base fixed to a roof of said vehicle, and another end of said shaft being inserted into said sun-visor body; and a low strength part provided on said shaft;

whereby when said shaft is situated adjacent the occupant restraint system and the occupant restraint system is operated, the shaft is deformed in said low strength part.

5. A sun-visor provided in a vehicle having an occupant restraint system for protecting the occupant from the side-impact according to claim 4, wherein said low strength part comprises a notch provided on said shaft.

6. A sun-visor provided in a vehicle having an occupant restraint system for protecting the occupant from the side-impact according to claim 4, wherein said low strength part is formed by heat treating a region of said shaft.

7. A sun-visor provided in a vehicle having an occupant restraint system for protecting the occupant from the side-impact according to claim 1, wherein said occupant restraint system is disposed in an upper portion of the vehicle near the sun-visor body.

8. A sun-visor provided in a vehicle having an occupant restraint system for protecting the occupant from the side-impact according to claim 4, wherein said occupant restraint system is disposed in an upper portion of the vehicle near the sun-visor body.

9. A sun-visor for use in a vehicle having an occupant restraint system for protecting an occupant from side-impact, said sun-visor comprising;

a sun-visor body for being disposed in a cabin of said vehicle for blocking off outside light;

a shaft having one end inserted into said sun-visor body to pivotally support the sun-visor body;

a base rotatably supporting another end of the shaft and adapted to be fixed to a roof of said vehicle;

said shaft having a low strength part; and whereby when said shaft is situated so as to be deformed in said low strength part when said occupant restraint system is operated.

10. A sun-visor for use in a vehicle having an occupant restraint system for protecting the occupant from the side-impact according to claim 9, wherein said low strength part comprises a notching defined in said shaft.

11. A sun-visor for use in a vehicle having an occupant restraint system for protecting the occupant from the side-impact according to claim 9, wherein said comprises a low strength part formed by heat treatment of said shaft.

* * * * *

UNITED STATES PATENT AND TRADEMARK OFFICE
CERTIFICATE OF CORRECTION

PATENT NO. : 6,604,773 B2
DATED : August 12, 2003
INVENTOR(S) : Takashi Aoki et al.

It is certified that error appears in the above-identified patent and that said Letters Patent is hereby corrected as shown below:

Column 1,
Line 40, change "when the air bag stored it the roof side rail is inflated, for" to
-- when the air bag stored in the roof side rail is inflated, for -- .

Column 2,
Line 3, change "the occupant from side-impact, said sun-visor comprising; a" to
-- the occupant from side-impact, said sun-visor comprising: a --.
Line 9, change "exposed from said sun-visor body and said base; and the" to
-- exposed from said sun-visor body and said base, and the --.
Line 40, change "FIG. 5 is a explanation view similar to FIG. 4, but" to
-- FIG. 5 is an explanation view similar to FIG. 4, but --.
Line 42, change "has been deployed and deformed the sun visor shaft." to
-- has been deployed and deformed the sun-visor shaft. --.
Line 60, change "under-a use condition adjacent a side window. FIG. 5 is an" to
-- under a use condition adjacent a side window. FIG. 5 is an --.
Line 62, change "bag, where the sun visor has been deformed by the air bag." to
-- bag, where the sun-visor shaft has been deformed by the air bag. --.

Column 6,
Line 12, change "part of the long shaft arm 17*a* at the notched part of the sun" to
-- part of the long shaft arm 17*a* at the notched part of the sun- --.
Line 35, change "be understood, any type of formation manner can be adopted" to
-- be understood, any type of formation can be adopted --.
Line 40, change "lower strength than other parts of the shaft is provide on the" to
-- lower strength than other parts of the shaft is provided on the --.
Line 67, change "impact, said sun-visor comprising;" to -- impact, said sun-visor comprising: --.

Column 7,
Line 20, change "region is formed by heat treating on said curved part." to
-- region is formed by heat treating said curved part. --.
Line 23, change "impact, said sun-visor comprising;" to -- impact, said sun-visor comprising: --.

UNITED STATES PATENT AND TRADEMARK OFFICE
CERTIFICATE OF CORRECTION

PATENT NO. : 6,604,773 B2
DATED : August 12, 2003
INVENTOR(S) : Takashi Aoki et al.

It is certified that error appears in the above-identified patent and that said Letters Patent is hereby corrected as shown below:

Column 8,
Line 17, change "impact, said sun-visor comprising;" to -- impact, said sun-visor comprising: --.
Line 33, change "comprises a notching defined in said shaft." to -- comprises a notch defined in said shaft. --.
Line 36, change "impact according to claim 9, wherein said comprises a low" to -- impact according to claim 9, wherein said low strength part is --.

Signed and Sealed this

Ninth Day of March, 2004

JON W. DUDAS
*Acting Director of the United States Patent and Trademark Office*